(12) United States Patent
Nicoletti et al.

(10) Patent No.: US 8,291,404 B1
(45) Date of Patent: Oct. 16, 2012

(54) UPDATING SYSTEM STATUS

(75) Inventors: Jennifer LM. Nicoletti, Southborough, MA (US); Lynn A. Bryant, Marlborough, MA (US); Russell R. Laporte, Webster, MA (US)

(73) Assignee: EMC Corporation, Hopkinton, MA (US)

( * ) Notice: Subject to any disclaimer, the term of this patent is extended or adjusted under 35 U.S.C. 154(b) by 875 days.

(21) Appl. No.: 12/411,017

(22) Filed: Mar. 25, 2009

(51) Int. Cl.
*G06F 9/44* (2006.01)
(52) U.S. Cl. ............................................. 717/168
(58) Field of Classification Search .......... 717/168–171
See application file for complete search history.

(56) References Cited

U.S. PATENT DOCUMENTS

| | | | |
|---|---|---|---|
| 2006/0179028 A1* | 8/2006 | Bram et al. | 706/47 |
| 2007/0266216 A1* | 11/2007 | Arakawa et al. | 711/165 |
| 2009/0012993 A1* | 1/2009 | Conn et al. | 707/103 R |
| 2009/0100110 A1* | 4/2009 | Holtom | 707/200 |
| 2010/0306176 A1* | 12/2010 | Johnson et al. | 707/664 |

* cited by examiner

*Primary Examiner* — Anna Deng
(74) *Attorney, Agent, or Firm* — Krishnendu Gupta; Jason A. Reyes; John T. Hurley

(57) ABSTRACT

A method is used in updating system status. Updated information is received for a managed object in a data storage system. From the updated information and an existing software object having other information about the managed object, a new software object is derived representing the managed object. Merge logic is applied to update the existing software object based on the new software object. The merge logic being capable of updating an existing full model of the data storage system from a new full model of the data storage system.

18 Claims, 3 Drawing Sheets

UPDATING SYSTEM STATUS

BACKGROUND

1. Technical Field

This application relates to updating system status.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems, also referred to as server systems, may store and retrieve data using a storage device containing a plurality of host interface units, disk drives, and disk interface units. The host systems access the storage device through a plurality of channels provided therewith. Host systems provide data and access control information through the channels to the storage device, and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Configuration information may be associated with a data storage system. The configuration information may include information describing the physical and/or logical configuration in the data storage system. The logical configuration information may include, for example, information regarding logical objects such as RAID groupings, logically defined devices, and the like.

Client-server computer storage configurations or networks are well known. The "client" (human user, or graphical user interface (GUI), or workstation, etc.) is operatively coupled to hardware/software functionality known as the "server" which services the client by responding to client requests to store information and/or retrieve stored information. Multiple clients can be operatively coupled to multiple servers in a particular client-server network configuration. Effective management of client-server networks is very important to ensure that the networks operate as intended and serve network users as expected. This management function may be accomplished through distributed management software which can be distributed throughout a client-server network. If a client-server network is running such software that is also object-oriented, typically many objects reside in each of the clients and/or servers. An object, in computer software terms, is a dedicated area of memory which can be thought of as an impervious container holding both data and instructions within itself, both defining itself and its relationships to other objects in the computer system or network. An object can send and receive messages to and from other objects, respond and react to such messages (e.g. commands) but shall normally be impervious to internal scrutiny. For example, in a storage processor each object may describe or relate to a specific tangible detail in the processor (e.g. a fan, power switch, cache memory, power supply, disk drive interface, etc.). These tangible objects in the storage processor can send messages to each other and to other objects outside the processor such as a disk array.

SUMMARY OF THE INVENTION

A method is used in updating system status. Updated information is received for a managed object in a data storage system. From the updated information and an existing software object having other information about the managed object, a new software object is derived representing the managed object. Merge logic is applied to update the existing software object based on the new software object. The merge logic being capable of updating an existing full model of the data storage system from a new full model of the data storage system.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF EMBODIMENT(S)

Described below is a technique for use in updating system status. In accordance with the technique, a method may be provided for efficient partial polling leveraging an existing update process. In particular, data storage system ("array") status may be maintained in an efficient and scalable manner, such that new management system model ("subsystem") portions are built for only those parts of the system that have actually changed, while re-using an existing system update mechanism. Such re-use helps reduce risk through significant changes in how array status is maintained.

Conventionally, an entire new subsystem is built after each poll and is submitted to merge and update logic of the existing system update mechanism. In the conventional system, the merge and update logic recurses through a production ("golden") subsystem and updates each object in the golden subsystem based on its corresponding object in the new subsystem.

Generally, array objects managed by the management system are largely static—very few objects change from poll to poll. Building the entire new subsystem after each poll has some problems:

Performance: rebuilding objects that have not changed consumes time and processing resources.

Scalability: The more objects the management system tries to model, the worse performance becomes. More LUNs, more hosts, and more storage groups eventually render the management system unusable or nearly unusable.

In at least one implementation, building subsystem portions only for objects that have changed and re-using the merge and update logic allows the management system to be more scalable and able to manage many more objects without excessive performance impact. Reusing the merge and update logic allows this to happen without changing existing observer software or the interface to client applications served by the management system, which need not be aware of changes underneath in accordance with the technique.

Figure 1:
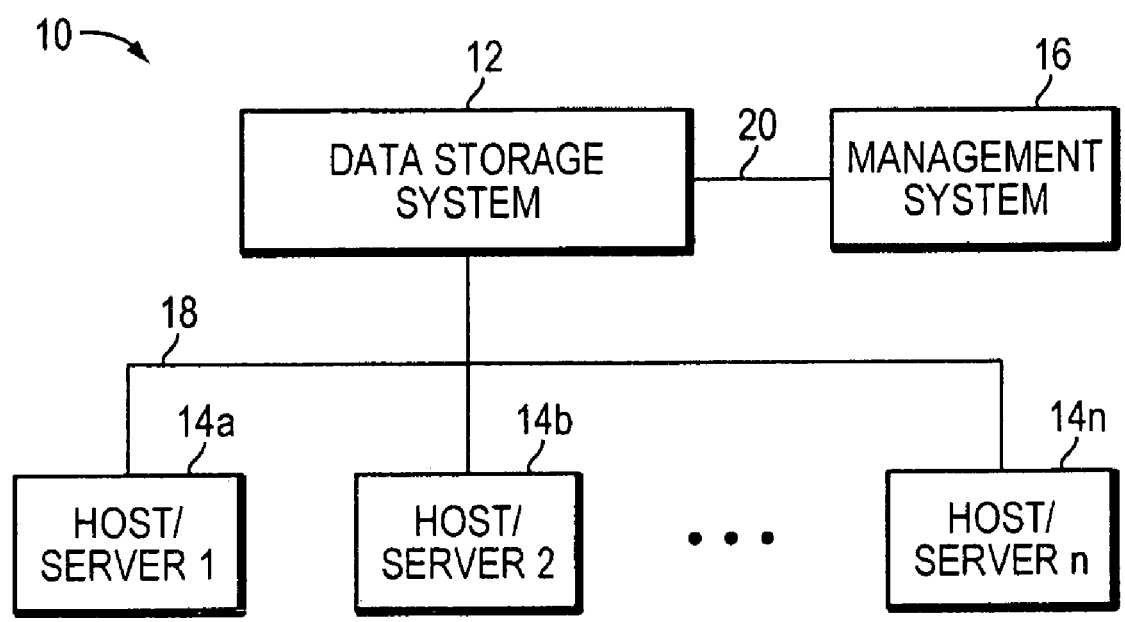
FIG. 1 is an example of an embodiment of a computer system that may utilize the techniques described herein.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection (s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSCI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSCI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

Figure 2:
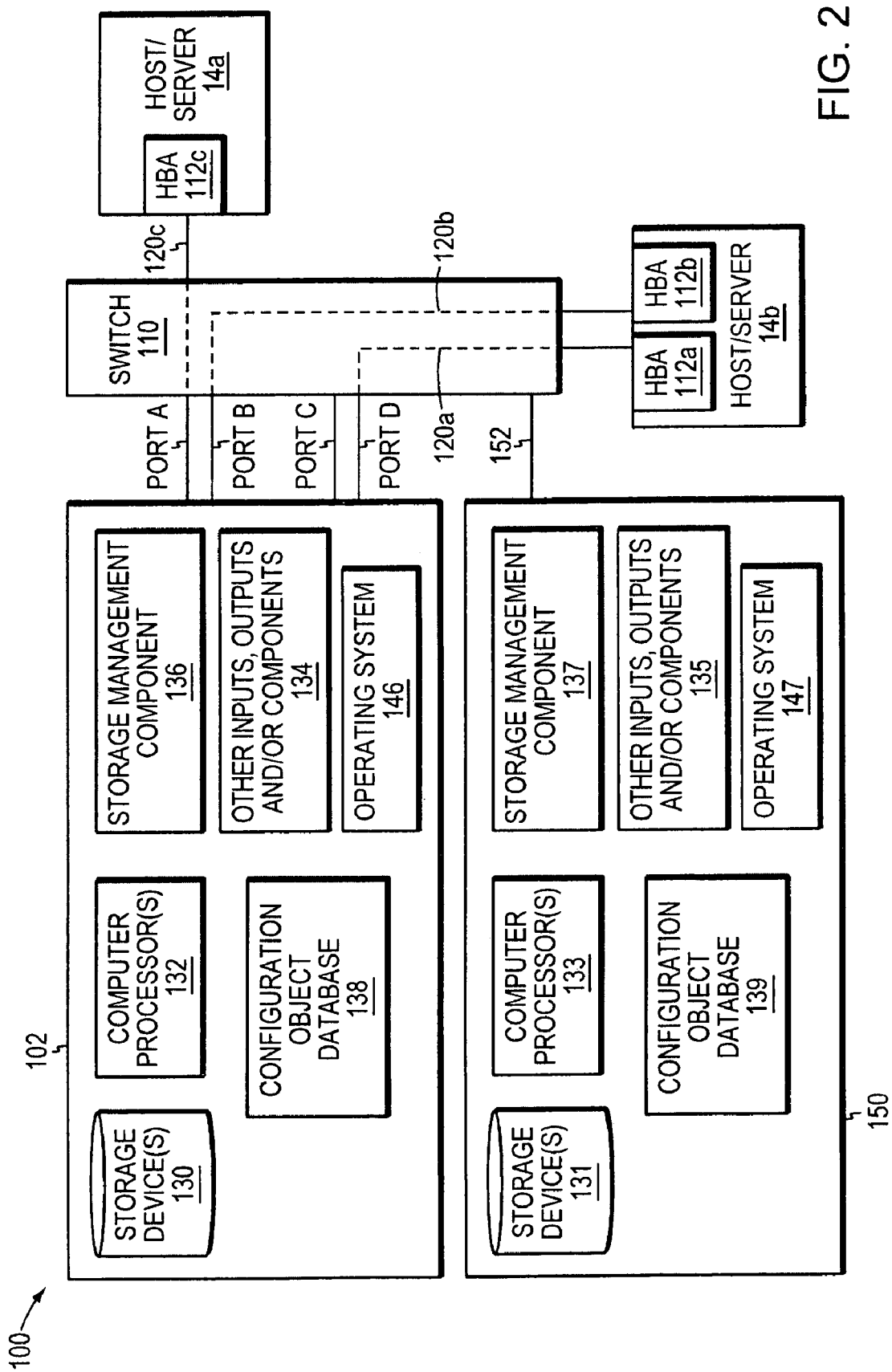
FIGS. 2-3 illustrate in more detail components that may be included in an embodiment of the system of FIG. 1.

Referring now to FIG. 2, shown is an example 100 of components that may be used in connection with techniques described herein. The example 100 may represent components illustrated in connection of FIG. 1 configured in a storage area network (SAN). Included in the example 100 are data storage systems 102 and 150, a switch 110, and hosts or servers 14a and 14b. The switch 110 may be used in connection with facilitating communications between each of the hosts 14a and 14b and the data storage systems 102 and 150. Communications between a host and the data storage system 102 may be defined in terms of a path. Host 14a communicates with the data storage system 102 over a path designated as 120c. Path 120c is formed by the starting point, the HBA or host bus adapter 112c and the ending point, port A of the receiving data storage system 102. Host 14b communicates with the data storage system 102 over two paths designated as 120a and 120b. Path 120a is formed by the starting point, the HBA 112a, and the ending point, port d of the receiving data storage system 102. Path 120b is formed by the starting point, the HBA 112b, and the ending point, port b of the receiving data storage system 102. It should be noted that different HBAs from the same or different hosts may also communicate with the data storage system through a same port of the data storage system although each path 112a, 112b, and 112c use a different port. An embodiment may represent a path using the WWN (world wide name) of a host's HBA and the WWN of a data storage system port receiving the request. As known to those skilled in the art, a WWN is a unique number assigned by a recognized naming authority that identifies a connection or a set of connections to the network. As also known to those skilled in the art, various networking technologies that may be used in an embodiment make use of WWNs.

Each HBA may include one or more ports although in the example illustrated, each HBA has only a single port. As represented with element 152, connections between the hosts using switch 110 may be made with respect to data storage system 150. Although only two data storage system are illustrated for purposes of simplicity in illustration, each of the hosts may have connections to other data storage systems in the SAN. Additionally, each host may be connected to the data storage systems 102, 150 using other connections, including direct cabling, than as illustrated in FIG. 2.

The data storage system 102 is illustrated as including one or more storage devices 130, one or more computer processors 132, an operating system 146, a configuration object database 138, a storage management component 136, and other inputs, outputs and/or components 134.

An example of an embodiment of the data storage system 102 is the CLARiiON™ data storage system by EMC Corporation which includes two computer processors as represented by the element 132 although an embodiment may include a different number of processors for use in connection with the techniques described herein.

The one or more storage devices 130 may represent one or more physical devices, such as disk drives, that may be accessed in logical units (e.g., as LUNs). The operating system 146 may be any one of a variety of commercially available, proprietary, or other operating system capable of execution by the one or more computer processors 132 in accordance with the particulars of the data storage system 102. In one embodiment, the operating system 146 may be or include the Windows XP™ operating system by Microsoft Corporation.

The storage management component 136 may be a component included as part of management software for management of the data storage system. The component 136 may manage the configuration object database 138 which includes data structures of configuration information for the data storage system 102. The configuration information may include data describing a defined configuration such as the different components as well as data regarding the performance and other aspects of these components. The configuration information may include information regarding physical components, logical components, and other general configuration information. The physical component information may include information about physical components in the data storage system, for example, the physical disks, fans, and the like. The logical component information may include information about the logically defined components such as, for example, the LUNs, defined RAID groupings (RGs), storage groups of LUNs (SGs), and the like. Such logical component information may include what storage groups are defined and what LUNs are included in each of the SGs. Other general configuration information may include, for example, the WWN of the data storage system, the serial number of the data storage system, and the like.

Configuration information, such as the logical device definitions and SGs, may be defined by a data storage system manager using the management system 16. The foregoing configuration information may be received by component 136 and may be used in connection with populating the configuration object database 138. It should be noted that although a database is used in connection with storing the configuration information, it will be appreciated by those skilled in the art that other data stores or data containers may be used.

The other inputs, outputs, and/or components 134 may represent other hardware and/or software components that may be included in the data storage system 102. The element 134 may include software components such as, for example, other management software for management of the data storage system, and the like. The element 134 may also include hardware components such as, for example, memory, other storage areas, and the like. The element 134 may also include other inputs and/or outputs such as command line inputs, configuration options, and the like, as described herein.

Figure 3:
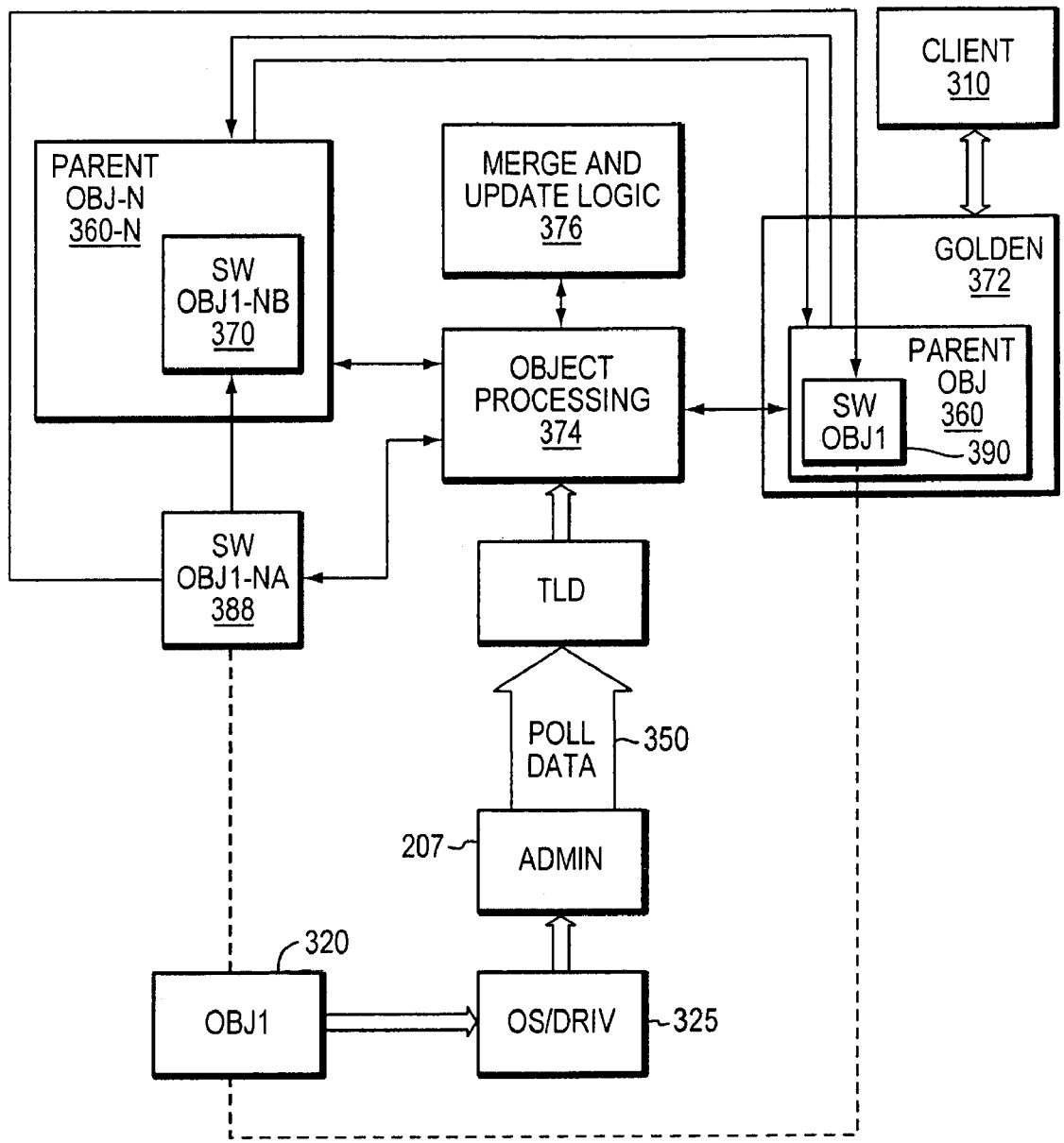

FIG. 3 illustrates additional aspects of data storage system 102 supporting an example implementation of the technique referenced above. All or a portion of operating system/driver 325 may be or be included in operating system 146. Managed object OBJ1 320 may be or include any managed object (physical or logical object) in the system (e.g., disk, LUN). The remaining aspects of FIG. 3 are included in storage management component 136, configuration object database 138, and/or other inputs, outputs and/or components 134.

As shown in FIG. 3, through operating system/driver 325, admin software 335 receives property data pertaining to object 320. On request, admin software 335 makes information derived from such property data available to object processing software 374 and, as further described below, ultimately to client software 310 (e.g., user interface software) through golden subsystem 372. Golden subsystem 372 serves as a master model of the data storage system 102 for purposes of client software 310. For example, to display configuration and/or component information in a user interface, client software 310 accesses golden subsystem 372, specifically at least one parent object, e.g., object PARENT OBJ 360, and/or at least one child object, e.g., software object SW OBJ1 390 which represents object 320. In at least one implementation, object 360 operates as a container for one or more objects including object 390.

Object processing software 374 operates as described herein to help keep golden subsystem 372 up to date based on poll data 350. When poll data 350 indicates that a change has occurred for object 320, object processing software 374 causes a new software object SW OBJ1-NA 388 to be built reflecting such changes. Object processing software 374 next proceeds in one of two different ways depending on the ability of merge and update logic 376 is able to process software object SW OBJ1-NA 388.

If software object SW OBJ1-NA 388 represents a first type of object, object processing software 374 is able to update software object SW OBJ1 390 based on object 388 by submitting object 388 to merge and update logic 376 which detects differences between object 390 and object 388 and causes object 390 to match object 388.

If software object SW OBJ1-NA 388 represents a second type of object, object processing software 374 cannot update software object SW OBJ1 390 by submitting object 388 to merge and update logic 376 as described above. In such a case of the second type of object, object processing software 374 causes a temporary new parent object PARENT OBJ-N 360-N to be built which is a copy of object PARENT OBJ 360. (In at least one implementation, poll data 350 if first checked to determine whether poll data 350 otherwise already includes enough data to support creation of the temporary new parent object without copying from object PARENT OBJ 360.) Object PARENT OBJ-N 360-N includes an object SW OBJ1-NB 370 which, when created with object 360-N, is an unupdated copy of object 390. Object processing software 374 then causes object 370 to be updated based on object 388. (In at least one implementation, here one or more other updates are made to parent object 360-N as needed based on poll data 350, e.g., so that it represents a further and/or fully updated version of object 360.) At that point, parent object 360-N, including its now updated child object 370, is submitted to merge and update logic 376. In operating to update parent object 360 based on parent object 360-N, merge and update logic 376 also updates object 390 based on object 370. Thus, by updating the parent object 360, merge and update logic 376 is also able to update child object 390.

Thus, for example, since the merge and update logic cannot accept a RAID group object, a new RAID group feature object including the RAID group object is created based on copying a corresponding existing RAID group feature object from the golden subsystem, and the new RAID group feature object is submitted to the merge and update logic. In another example, if the poll data indicates that physical memory has changed, the object processing software causes a new cache object to be copied from an existing cache object, updates the new cache object to reflect the physical memory changes, and submits the new cache object to the merge and update logic. In a further example, in a ripple effect, the merge and update logic may be able to update object 390 based on object 388 but there may be other objects of parent object 360 that also need to be updated as a result, and data 350 does not include sufficient information to update the other objects, so updating object 360 based on object 360-N better maintains the integrity of golden subsystem 372.

In at least one implementation in accordance with the technique, several components of system management reside on host computers and are referred to as client components. One component in particular, Raid++, has both a client and server instance. The server side management components interact with the user interfaces and tools for administering the system configuration and operation and to report on system operation. The server side components are comprised of middleware which resides between the user and the storage management components of the system which implement management system storage features. The server side components are basically divided into two groups, the legacy Raid++ module which provides the majority of the management services, and a CIMOM and its providers. The Raid++ module uses a proprietary transport to communicate with management clients. The Raid++ module maintains an object model of the system (e.g., golden subsystem 372) that it uses for managing the system; it updates the model repeatedly (e.g., periodically) by polling the system as described herein.

The environment as described herein may be characterized as an area which may be loaded with objects used in subsequent processing. As described herein, objects may be cached in an environment associated with a script so that the same cached object(s) are defined or loaded with subsequent executions of the same script. In other words, the cached object is loaded into the environment associated with the next execution instance of the same script.

It should be noted that the various components used in connection with the techniques described herein may be implemented using hardware and/or software. For example, the components of the client support software may be written in any one or more programming and/or scripting languages such as, for example, C++, Java, and XML.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method, performed by one or more processors, for use in updating system status, the method comprising:
   receiving updated information for a managed object in a data storage system;
   determining a type of software object corresponding to the managed object, and selecting an existing software object based on the type;
   deriving, from the updated information and the existing software object having other information about the managed object, a new software object representing the managed object;
   causing a temporary new parent software object to be built, the temporary new parent software object being derived from the existing software object, and basing the derivation of the new software object on the new parent software object; and
   applying merge logic to update the existing software object based on the new software object, the merge logic being capable of updating an existing full model of the data storage system from a new full model of the data storage system.

2. The method of claim 1, further comprising:
   updating the existing full model for only parts of the data storage system that have changed.

3. The method of claim 1, further comprising:
   updating the existing software object while maintaining existing observer software.

4. The method of claim 1, further comprising:
   making information derived the updated information available to object processing software and to client software through the existing full model.

5. The method of claim 1, wherein the updated information comprises poll data.

6. The method of claim 1, further comprising:
determining a type of software object corresponding to the managed object; and
based on the type, selecting a software object directly representing the managed object as the existing software object to use in the derivation.

7. The method of claim 1, further comprising:
determining a type of software object corresponding to the managed object; and
based on the type, selecting a parent software object as the existing software object to use in the derivation.

8. The method of claim 1, further comprising:
causing a temporary new parent software object to be built, the temporary new parent software object being derived from the existing software object, the temporary new parent software object containing the new software object; and
updating the new software object.

9. The method of claim 1, further comprising:
further deriving the new software object from poll data.

10. The method of claim 1, further comprising:
based on an existing RAID group feature object from the existing full model, creating a new RAID group feature object comprising a RAID group object;
updating the RAID group object; and
submitting the new RAID group feature object to the merge logic.

11. The method of claim 1, further comprising:
determining whether physical memory has changed in the data storage system;
based on the determination, causing a new cache object to be copied from an existing cache object;
based on the determination, updating the new cache object; and
submitting the new cache object to the merge logic.

12. The method of claim 1, further comprising:
updating another software object that needs to be updated as a result of the new software object, wherein poll data lacks sufficient information to update the other software object.

13. The method of claim 1, further comprising:
updating another software object that needs to be updated as a result of the new software object to maintain the integrity of the existing full model.

14. A system including one or more processors for use in updating system status, the system comprising:
first logic receiving updated information for a managed object in a data storage system, determining a type of software object corresponding to the managed object, and selecting an existing software object based on the type;
second logic deriving, from the updated information and an existing software object 10 having other information about the managed object, a new software object representing the managed object, causing a temporary new parent software object to be built, the temporary new parent software object being derived from the existing software object, and basing the derivation of the new software object on the new parent software object; and
third logic applying merge logic to update the existing software object based on the new software object, the merge logic being capable of updating an existing full model of the data storage system from a new full model of the data storage system.

15. The system of claim 14, further comprising:
fourth logic updating the existing full model for only parts of the data storage system that have changed.

16. The system of claim 14, further comprising:
fourth logic updating the existing software object while maintaining existing observer software.

17. The system of claim 14, further comprising:
fourth logic making information derived the updated information available to object processing software and to client software through the existing full model.

18. The system of claim 14, wherein the updated information comprises poll data.

* * * * *